(12) United States Patent  
Marcouiller et al.

(10) Patent No.: US 8,038,356 B2
(45) Date of Patent: Oct. 18, 2011

(54) HARDENED FIBER OPTIC CONNECTOR WITH CONNECTOR BODY JOINED TO CYLINDRICAL CABLE BY UNITARY HOUSING

(75) Inventors: Thomas Marcouiller, Shakopee, MN (US); Ponharith Nhep, Savage, MN (US); Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 115 days.

(21) Appl. No.: 12/427,472

(22) Filed: Apr. 21, 2009

(65) Prior Publication Data

US 2009/0304335 A1 Dec. 10, 2009

Related U.S. Application Data

(60) Provisional application No. 61/046,700, filed on Apr. 21, 2008.

(51) Int. Cl.
*G02B 6/36* (2006.01)

(52) U.S. Cl. .............. 385/78; 385/76; 385/77; 385/81; 385/86; 385/87

(58) Field of Classification Search .............. 385/87
See application file for complete search history.

(56) References Cited

U.S. PATENT DOCUMENTS

| 5,212,752 | A | 5/1993 | Stephenson et al. |
|---|---|---|---|
| 5,214,732 | A | 5/1993 | Beard et al. |
| 5,261,019 | A | 11/1993 | Beard et al. |
| 5,293,582 | A | 3/1994 | Beard et al. |
| 5,317,663 | A | 5/1994 | Beard et al. |
| 5,436,995 | A * | 7/1995 | Yoshizawa et al. ............. 385/86 |
| 5,671,310 | A | 9/1997 | Lin et al. |
| 5,768,455 | A | 6/1998 | Konik |
| 5,809,192 | A | 9/1998 | Manning et al. |
| 6,419,402 | B1 * | 7/2002 | Zimmel ......................... 385/86 |
| 6,461,055 | B1 | 10/2002 | Zimmel |
| 6,579,014 | B2 | 6/2003 | Melton et al. |
| 6,648,520 | B2 | 11/2003 | McDonald et al. |
| 6,899,467 | B2 | 5/2005 | McDonald et al. |
| 6,916,120 | B2 | 7/2005 | Zimmel et al. |
| 6,962,445 | B2 | 11/2005 | Zimmel et al. |
| 7,292,763 | B2 | 11/2007 | Smith et al. |
| 2007/0077010 | A1 | 4/2007 | Melton et al. |
| 2008/0044137 | A1 | 2/2008 | Luther et al. |
| 2008/0131132 | A1 | 6/2008 | Solheid et al. |

FOREIGN PATENT DOCUMENTS

| EP | 1 091 226 A1 | 4/2001 |
|---|---|---|
| WO | WO 95/35520 | 12/1995 |

OTHER PUBLICATIONS

International Search Report and Written Opinion mailed Sep. 18, 2009.

* cited by examiner

*Primary Examiner* — Uyen Chau N Le
*Assistant Examiner* — Chad Smith
(74) *Attorney, Agent, or Firm* — Merchant & Gould P.C.

(57) ABSTRACT

A hardened fiber optic connector includes a unitary housing that mounts a connector body. The hardened fiber optic connector terminates a fiber optic cable including a strength layer and can be connected to a hardened fiber optic adapter. The unitary housing can transfer loads between the fiber optic cable and the hardened fiber optic adapter.

28 Claims, 17 Drawing Sheets

HARDENED FIBER OPTIC CONNECTOR
WITH CONNECTOR BODY JOINED TO
CYLINDRICAL CABLE BY UNITARY
HOUSING

CROSS REFERENCE TO RELATED APPLICATION

The present application claims the benefit of U.S. Provisional Patent Application Ser. No. 61/046,700, filed Apr. 21, 2008, which is hereby incorporated by reference in its entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

SUMMARY

One aspect of the present disclosure relates to a hardened fiber optic connector terminating a fiber optic cable including a strength layer and/or a strength member. The fiber optic cable also includes an optical fiber with a terminated end held by the hardened fiber optic connector. The hardened fiber optic connector can be connected to a hardened fiber optic adapter. In particular, a preferred embodiment of the hardened fiber optic connector includes a unitary housing that mounts a connector body and provides a secure attachment to the strength layer of the fiber optic cable. The unitary housing further transfers loads between the fiber optic cable and the hardened fiber optic adapter. Aspects of the present disclosure can also be included in non-hardened fiber optic connectors. In various embodiments, the hardened and/or the non-hardened fiber optic connectors can be used with hardened and/or non-hardened fiber optic adapters.

An example fiber optic connector of the present disclosure includes a unitary housing, a connector body, a compression sleeve, and a ferrule assembly.

The unitary housing extends from a first end to a second end and includes a central passage, a coupling protrusion, a flange, and a gripping surface. The central passage extends from the first end to the second end of the unitary housing, defines a longitudinal axis, and includes a spring pocket at the first end of the unitary housing. The optical fiber passes through the central passage. The coupling protrusion extends from a first end, at the first end of the unitary housing, to a second end and includes at least one coupling tab. The flange includes a face adjacent the second end of the coupling protrusion and at least one external shoulder that is opposite the face. The at least one external shoulder faces the second end of the unitary housing. The gripping surface is positioned adjacent the second end of the unitary housing.

The connector body extends from a first end to a second end and includes a portion that fits over the coupling protrusion adjacent the second end of the connector body. The connector body also includes a plug portion and at least one retention arm. The plug portion is at the first end of the connector body and is adapted for connection with the fiber optic adapter. The at least one retention arm extends from an end at the second end of the connector body towards the plug portion. The at least one retention arm includes an attachment slot that receives the at least one coupling tab of the coupling protrusion of the unitary housing.

The compression sleeve is positioned over the gripping surface of the unitary housing. The compression sleeve and the gripping surface are adapted to attach strength members of a fiber optic cable to the unitary housing between the compression sleeve and the gripping surface.

The ferrule assembly is mounted at least partially within the connector body. The ferrule assembly includes a ferrule and a spring. The ferrule includes a passage that the optical fiber passes through. The terminated end of the optical fiber is adjacent an end of the ferrule. The spring is positioned within the spring pocket of the central passage of the unitary housing and is configured to bias the ferrule towards the first end of the connector body.

The example fiber optic connector can also include a sleeve, a sealing member, and a retaining nut. The unitary housing can include an external piloting surface that extends from the at least one external shoulder of the flange towards the second end of the unitary housing. The sleeve can include an internal piloting surface that is positioned over the external piloting surface of the unitary housing and an internal shoulder that abuts the external shoulder of the flange of the unitary housing. The sealing member can be positioned at least partially within an exterior groove of the sleeve. The retaining nut can be positioned around a portion of the sleeve and can be adapted to abut a nut shoulder of the sleeve.

The example fiber optic connector can include a shrink tube adapted to be heat-shrunk and sealed about a shrink tube seat of the sleeve and a portion of the fiber optic cable. The sleeve, the sealing member, and the retaining nut can be adapted to be received within a port of the fiber optic adapter, and the fiber optic adapter can be a hardened fiber optic adapter. The at least one coupling tab of the coupling protrusion can include a sloped surface, and the at least one retention arm can include a ramp at the end of the at least one retention arm. The at least one retention arm can be a resilient retention arm and can spread apart from the longitudinal axis when the ramp engages the sloped surface. The attachment slot can snap over the coupling tab when the connector body is pressed onto the unitary housing. The at least one coupling tab of the coupling protrusion can include a first end and a second end, and the attachment slot of the at least one retention arm can include a first end and a second end. The first and the second ends of the attachment slot can engage the first and the second ends of the coupling tab to provide an anti-rotation connection between the unitary housing and the connector body. The at least one coupling tab of the coupling protrusion can be a pair of coupling tabs positioned on opposite sides of the longitudinal axis, and the at least one retention arm of the connector body can be a pair of retention arms. The attachment slot on each of the retention arms can receive one of the coupling tabs.

The compression sleeve can be a crimp sleeve.

An interior of the sleeve, that can include the internal piloting surface, can include at least one internal anti-rotation flat, and the flange of the unitary housing can include at least one external anti-rotation flat. The at least one internal anti-rotation flat can engage the at least one external anti-rotation flat to rotationally position the sleeve relative to the unitary housing. The sleeve can include at least one orientation control blade at a first end that is adapted for connection with the fiber optic adapter. The exterior groove can be positioned between the at least one orientation control blade of the sleeve and a second end, opposite the first end, of the sleeve. The nut shoulder of the sleeve can be positioned between the exterior groove and the second end of the sleeve. The shrink tube seat of the sleeve can be positioned between the nut shoulder and the second end of the sleeve.

DETAILED DESCRIPTION

Figure 1:
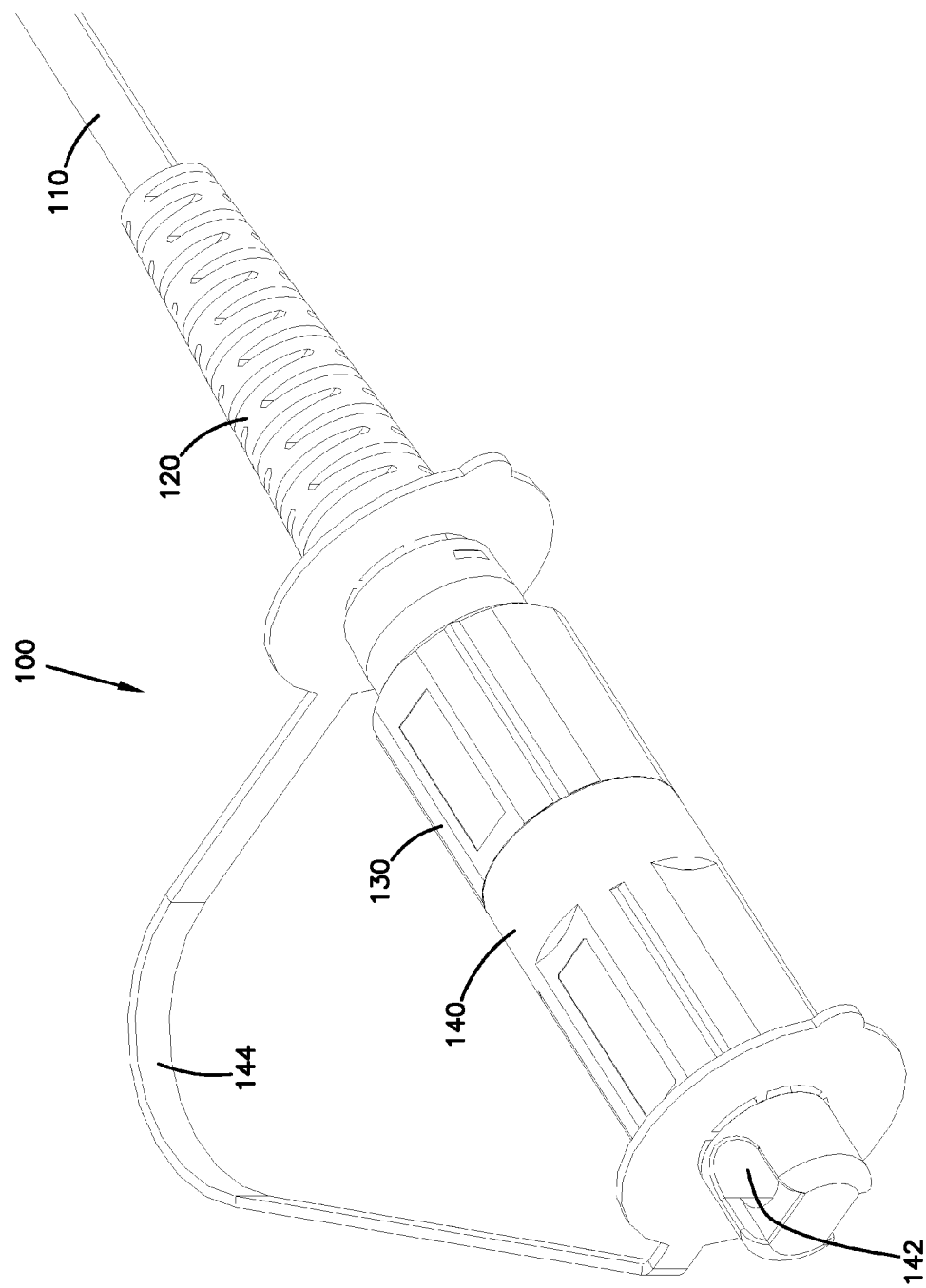
FIG. 1 is a perspective view of a hardened fiber optic connector terminating a cylindrical fiber optic cable with a protective cap installed.
Figure 2:
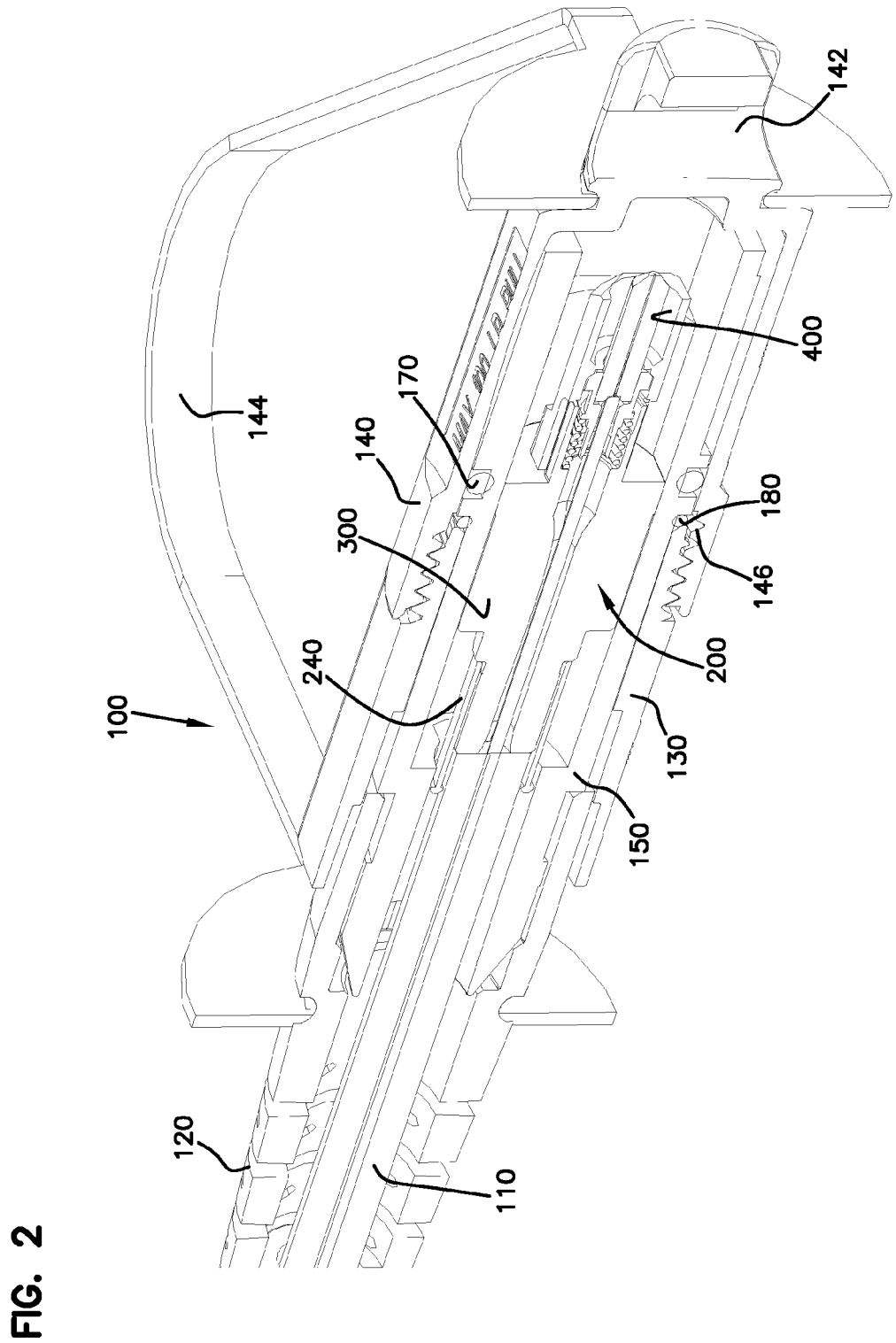
FIG. 2 is another perspective view of the hardened fiber optic connector of FIG. 1 shown in cross-section.
Figure 3:
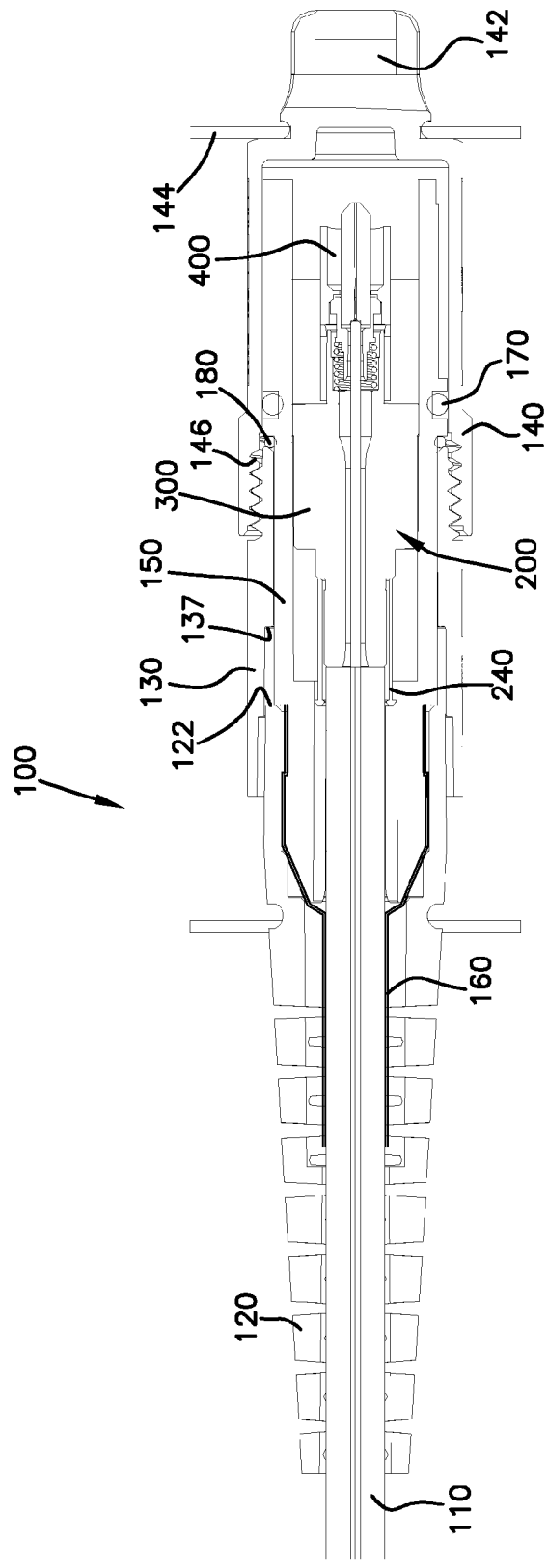
FIG. 3 is a cross-sectional elevation view of the hardened fiber optic connector of FIG. 1.
Figure 4:
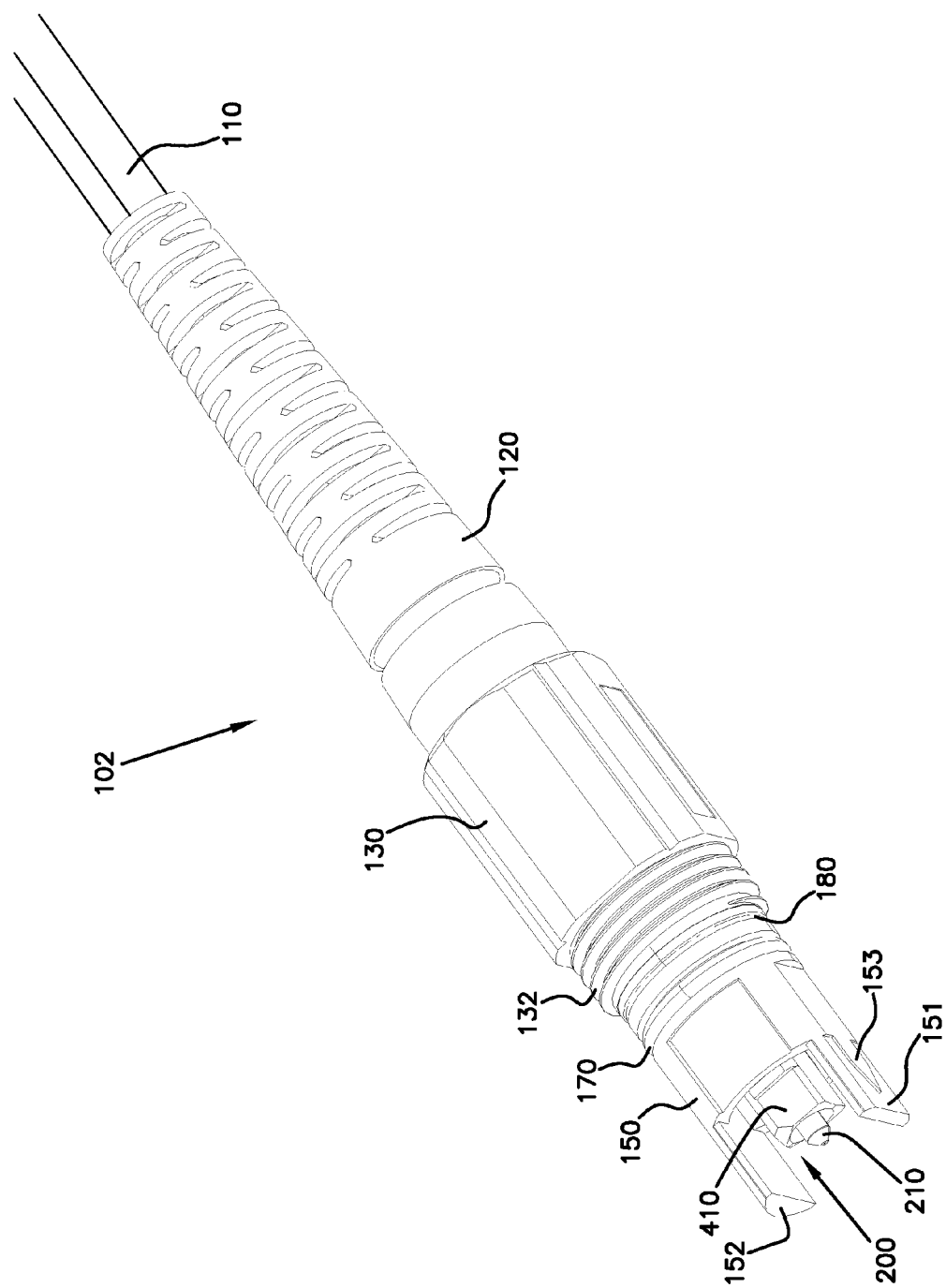
FIG. 4 is another perspective view of the hardened fiber optic connector of FIG. 1 with the protective cap removed.

FIGS. 1-10 depict a hardened fiber optic connector 102 in accordance with the principles of the present disclosure. FIGS. 1-3 show a connector and cap assembly 100 in accordance with the principles of the present disclosure. FIGS. 1-3 show the hardened fiber optic connector 102 with a protective cap 140 and a cap holding strap 144 installed thereon.

Hardened fiber optic connectors, such as the hardened fiber optic connector 102, are typically used in outdoor environments to terminate and connect outdoor fiber optic cables to hardened fiber optic adapters. The hardened fiber optic adapters are often used on outdoor fiber optic terminals or enclosures to provide a connection point for the fiber optic connector and thereby allow fiber optic signals to enter and exit the terminal or enclosure. The hardened adapter often includes a hardened first port for receiving the hardened connector, such as the hardened connector 102, and an unhardened second port for receiving an unhardened connector within the terminal or enclosure. One example of a hardened adapter mounted to a drop terminal is disclosed at U.S. Pat. No. 7,292,763, entitled FIBER ACCESS TERMINAL, issued on Nov. 6, 2007, and that is hereby incorporated by reference in its entirety. In another embodiment, one or more of the adapters can be mounted to a network interface device of the type disclosed at U.S. patent application Ser. No. 11/607,676, now U.S. Patent Application Pub. No. 2008/0131132 A1, entitled NETWORK INTERFACE DEVICE, filed on Dec. 1, 2006, and that is hereby incorporated by reference in its entirety.

In the present disclosure, the words "hardened", "ruggedized", and "outdoor" are used to characterize fiber optic adapters, connectors, and cables. By hardened or ruggedized, it is meant that the connector, the adapter, and/or the cable are adapted for outside environmental use. For example, the connector and the adapter can include environmental seals for preventing moisture/water intrusion. Also, it is preferred for such connectors, adapters, and cables to be able to withstand a 100 pound axial pull-out force and other strength tests with the connector and the adapter coupled together. The loads of the various strength tests can be applied at the cable or at the connector and supported by the adapter. In addition, a pulling force can be applied to such connectors when deploying the cables terminated by the connectors. For example, a pulling cord or rope can be attached to an eyelet 142 of the protective cap 140 attached to the hardened fiber optic connector 102 terminating a fiber optic cable 110. The fiber optic cable 110 can thereby be pulled through a conduit or lifted and routed to an overhead installation.

The hardened fiber optic connector 102 is preferably compatible with a hardened fiber optic adapter and terminates the fiber optic cable 110. The fiber optic cable 110 includes a strength layer 111. The strength layer 111 of the cable 110 can include strength members 118 such as KEVLAR fibers. The strength members 118 of the strength layer 111 can be individually positioned along the cable's 110 length or can be interwoven with each other. In examples given in the present disclosure, the fiber optic cable 110 is a cylindrical fiber optic cable with the strength layer 111 circumferentially positioned about an optical fiber 114 and an outer jacket 116 covering the strength layer 111. In other embodiments, the fiber optic cable 110 can take forms other than a cylindrical fiber optic cable and include strength members not arranged in a layer.

In the depicted embodiment, a connecting/sealing sleeve 150 of the hardened fiber optic connector 102 is inserted into the hardened fiber optic adapter or the protective cap 140 (see FIGS. 1-3). Orientation control blades 151, 152 can be provided on the connecting/sealing sleeve 150 to uniquely orient the connector 102 when inserted within the adapter. A position indicator 153 can be included on the blade 151 to indicate correct orientation between the connector 102 and the adapter.

A coupling nut 130 connects the connector 102 to the adapter and/or the protective cap 140. In particular, male threads 132 of the coupling nut 130 threadingly engage female threads 146 of the adapter or the protective cap 140. A nut shoulder 157 (see FIG. 9) on the connecting/sealing sleeve's 150 exterior abuts a bearing ring 134 (see FIG. 7) of the coupling nut 130. Optionally, a friction and/or sealing ring 180 can be positioned between the nut shoulder 157 of the connecting/sealing sleeve 150 and the bearing ring 134 of the coupling nut 130. A nut piloting diameter 156 of the connecting/sealing sleeve 150 linearly guides an inner diameter 136 of the coupling nut 130 (see FIGS. 8 and 10). The nut shoulder 157 of the connecting/sealing sleeve 150 thereby provides a structural connection, together with the coupling nut 130, between the hardened fiber optic connector 102 and the adapter or the protective cap 140.

A sealing member 170 can be positioned around the connecting/sealing sleeve 150 thereby providing a seal between the hardened fiber optic connector 102 and the adapter or the protective cap 140. In a preferred embodiment, the sealing member 170 is mounted in a seal groove 154 of the connecting/sealing sleeve 150 (see FIG. 5).

As described above, the connecting/sealing sleeve 150 includes the nut shoulder 157 providing part of the structural connection between the hardened fiber optic connector 102 and the adapter or the protective cap 140. In addition, an interior of the connecting/sealing sleeve 150 preferably includes a pair of internal shoulders 192 to continue the structural connection from the adapter or the protective cap 140 to a pair of external shoulders 344 of a unitary housing 300 of the connector 102 further described below. The interior of the connecting/sealing sleeve 150 preferably includes a pair of internal anti-rotation flats 194 and a piloting bore 198 to further engage the unitary housing 300.

Figure 16:
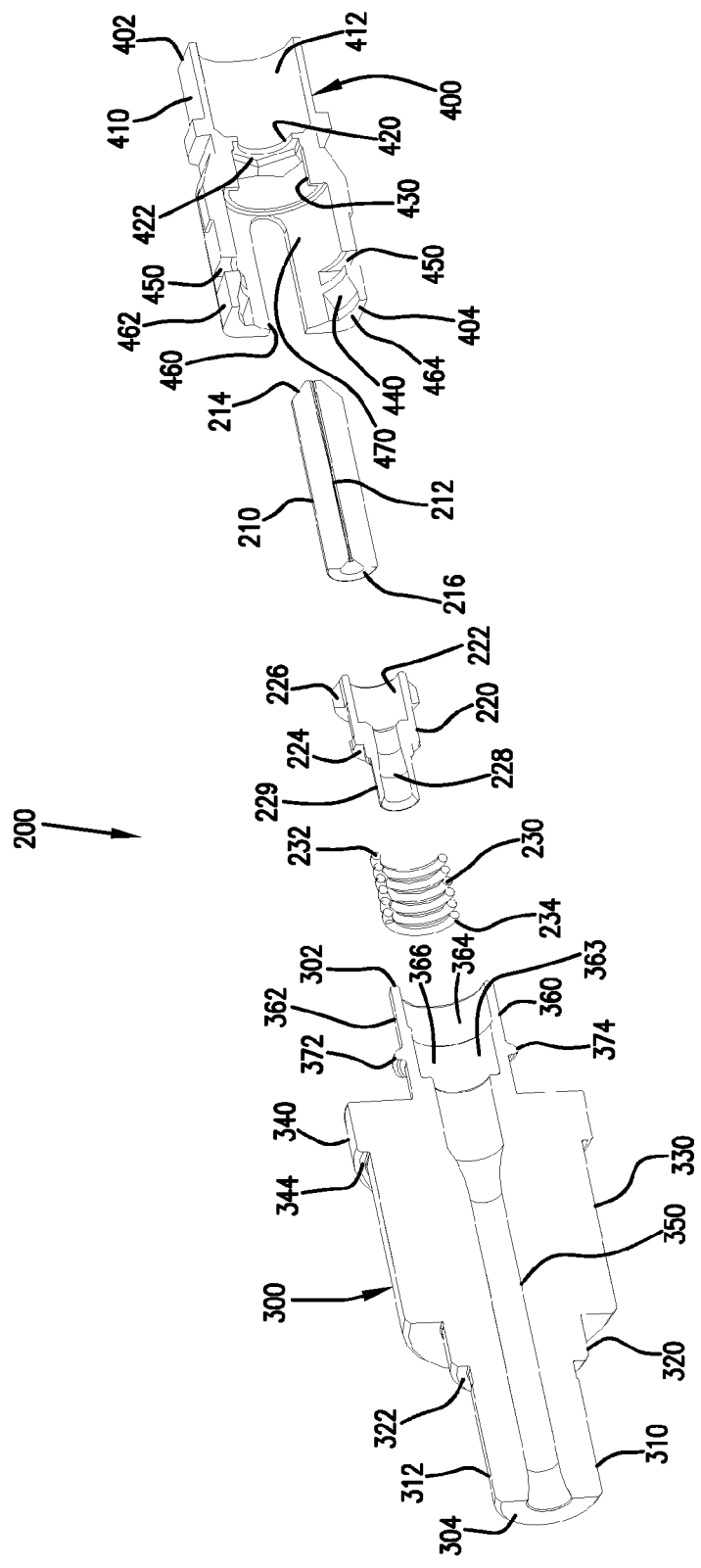
FIG. 16 is an enlarged portion of FIG. 10.
Figure 17:
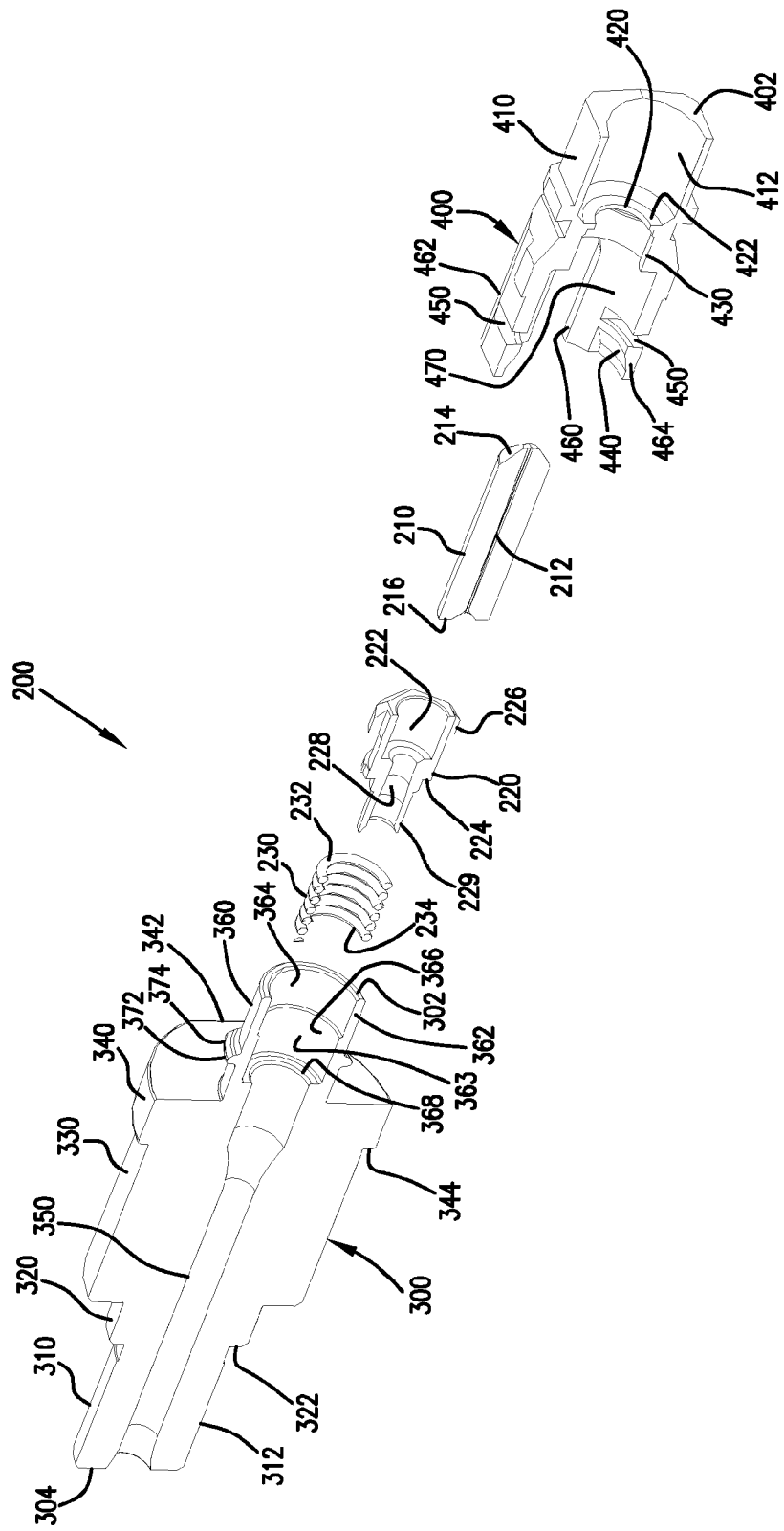
FIG. 17 is an enlarged portion of FIG. 8.

In a preferred embodiment, illustrated at FIGS. 2, 3, and 5-10, the hardened fiber optic connector 102 includes the unitary housing 300 and a connector body 400 (e.g., an "SC" connector body, an "SC" like connector body, or other types of connector bodies). A first end 404 of the connector body 400 is securely joined to the cylindrical fiber optic cable 110 by the unitary housing 300 and a crimp sleeve 240. A fiber optic ferrule 210, a fiber optic ferrule holder 220, and a ferrule spring 230 are contained within a cavity formed between the unitary housing 300 and the connector body 400. The connector body 400 includes a ferrule holder retainer 422 and a ferrule/ferrule holder support 420 (see FIG. 16). A second end 402 of the connector body 400 includes a plug portion 410 and a sleeve receiving portion 412 to engage various hardened and non-hardened fiber optic adapters and converters (e.g., adapters and converters compatible with SC connectors and SC connector bodies). The fiber optic ferrule 210, the fiber optic ferrule holder 220, the ferrule spring 230, the unitary housing 300, and the connector body 400 form a connector body assembly 200 included and shown within the fiber optic connector 102 at FIGS. 2-6.

The unitary housing 300 of the connector body assembly 200 includes load transferring features such as the pair of external shoulders 344 that engage the internal shoulders 192 of the connecting/sealing sleeve 150 (see FIG. 6), as mentioned above. The external shoulders 344 are preferably part of a flange 340 of the unitary housing 300 that radially extends beyond an external piloting diameter 330 of the unitary housing 300. The external piloting diameter 330 is held within the piloting bore 198 and the flange 340 is held within a flange receiving region 196 (see FIG. 8) of the connecting/sealing sleeve 150. The flange 340 further defines a pair of external anti-rotation flats 342 that engage the pair of internal anti-rotation flats 194 of the connecting/sealing sleeve 150.

Figure 12:
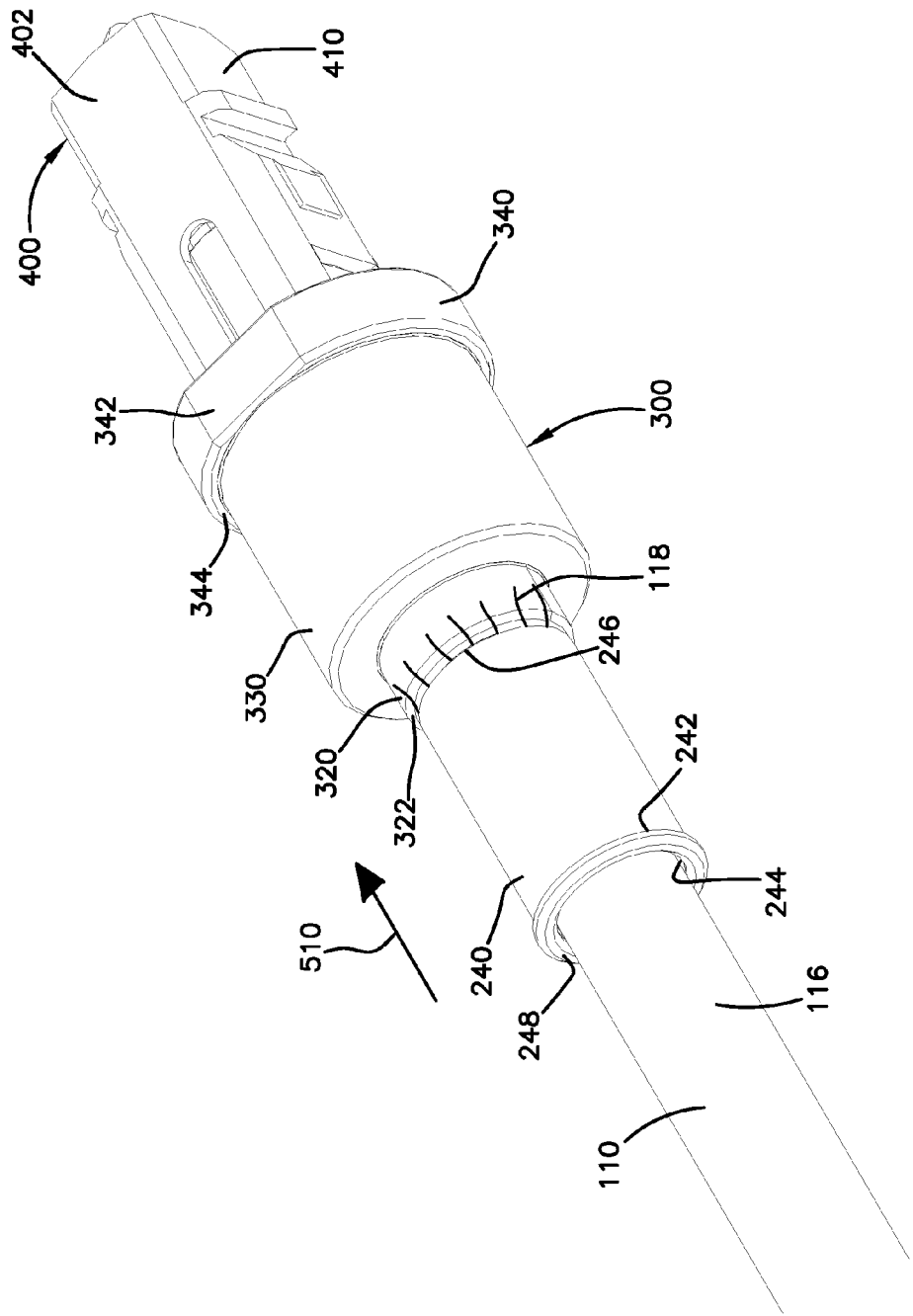
FIG. 12 is the perspective view of FIG. 11 with the crimp sleeve slidingly positioned over the gripping surface of the unitary housing thereby securing the strength members of the cylindrical fiber optic cable.
Figure 13:
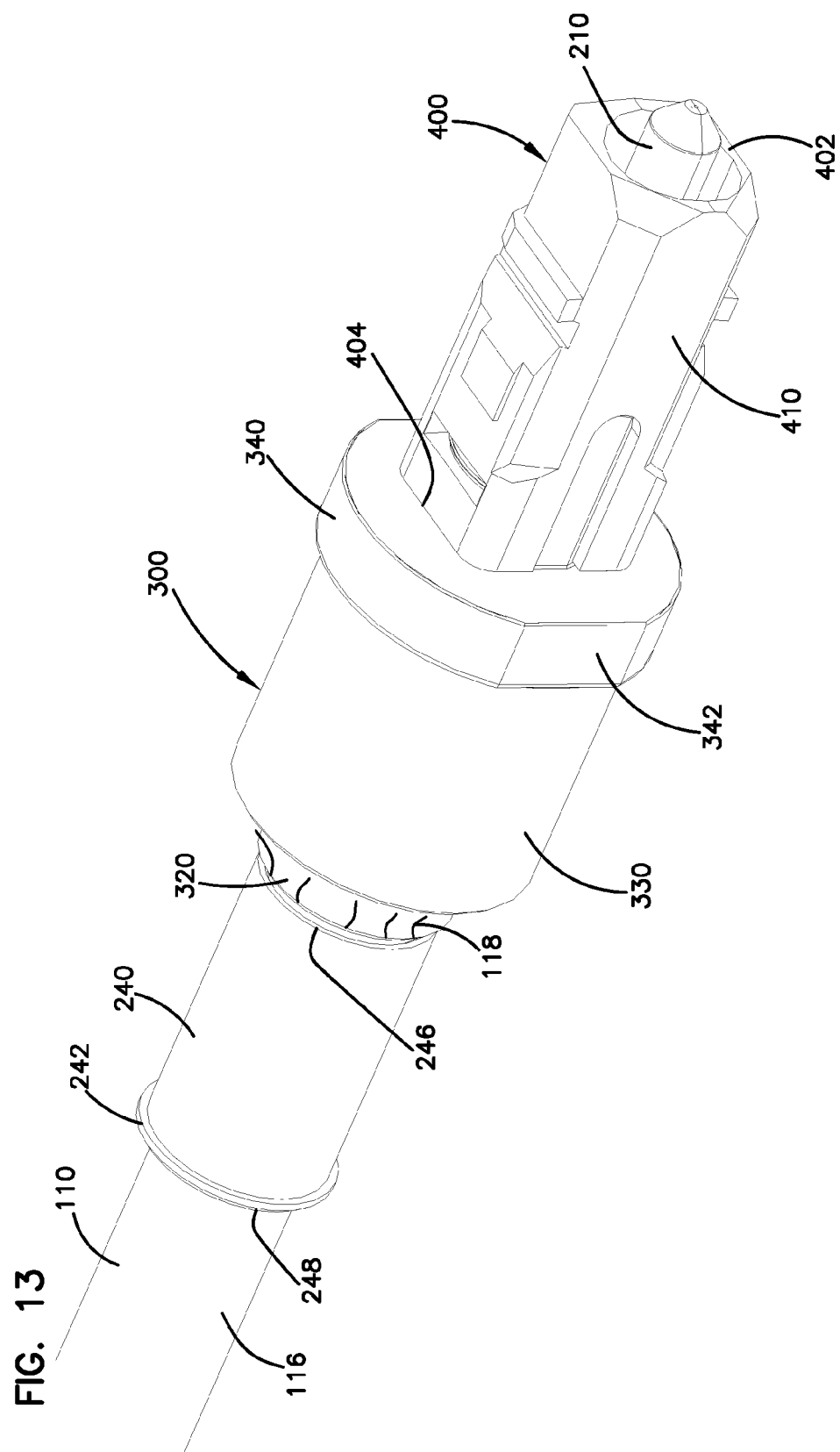
FIG. 13 is another perspective view showing the components and configuration of FIG. 12.

In addition to the load transferring external shoulders 344, the unitary housing 300 of the connector body assembly 200 is securely attached to the cylindrical fiber optic cable 110 by the crimp sleeve 240 (see FIGS. 12-15) and thereby continues the structural connection from the adapter or the protective cap 140 through the hardened fiber optic connector 102 to the fiber optic cable 110. This structural connection provides support for tensile loads within the fiber optic cable 110 anchored by the adapter or the protective cap 140. An external diameter 320 of the unitary housing 300 adjacent the assembled crimp sleeve 240 (see FIG. 12) preferably approximately matches the external diameter of the crimp sleeve. The external diameter 320 is adjacent a crimp sleeve stopping shoulder 322 of the unitary housing 300.

Figure 14:
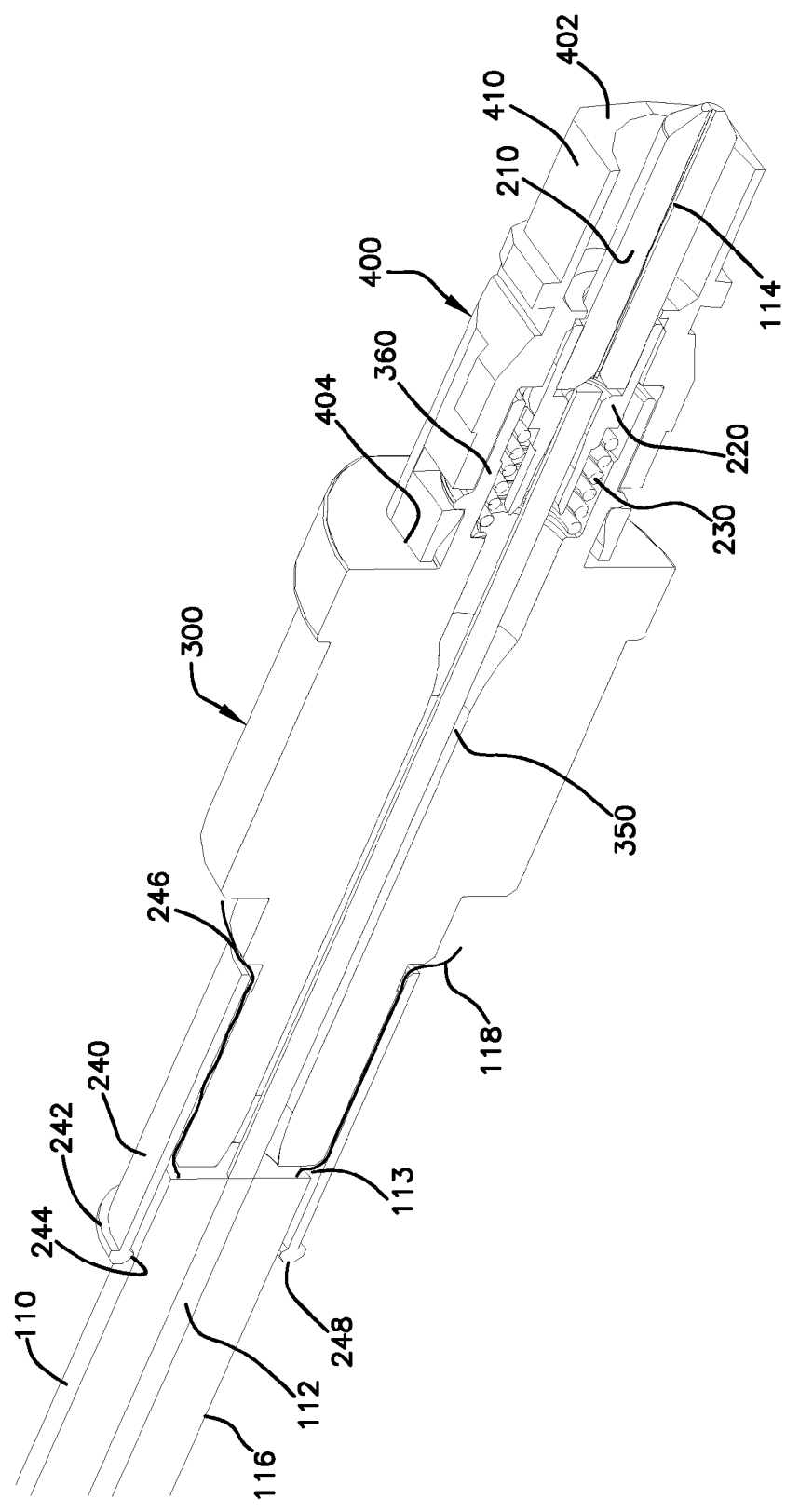
FIG. 14 is the perspective view of FIG. 13 shown in cross-section.
Figure 15:
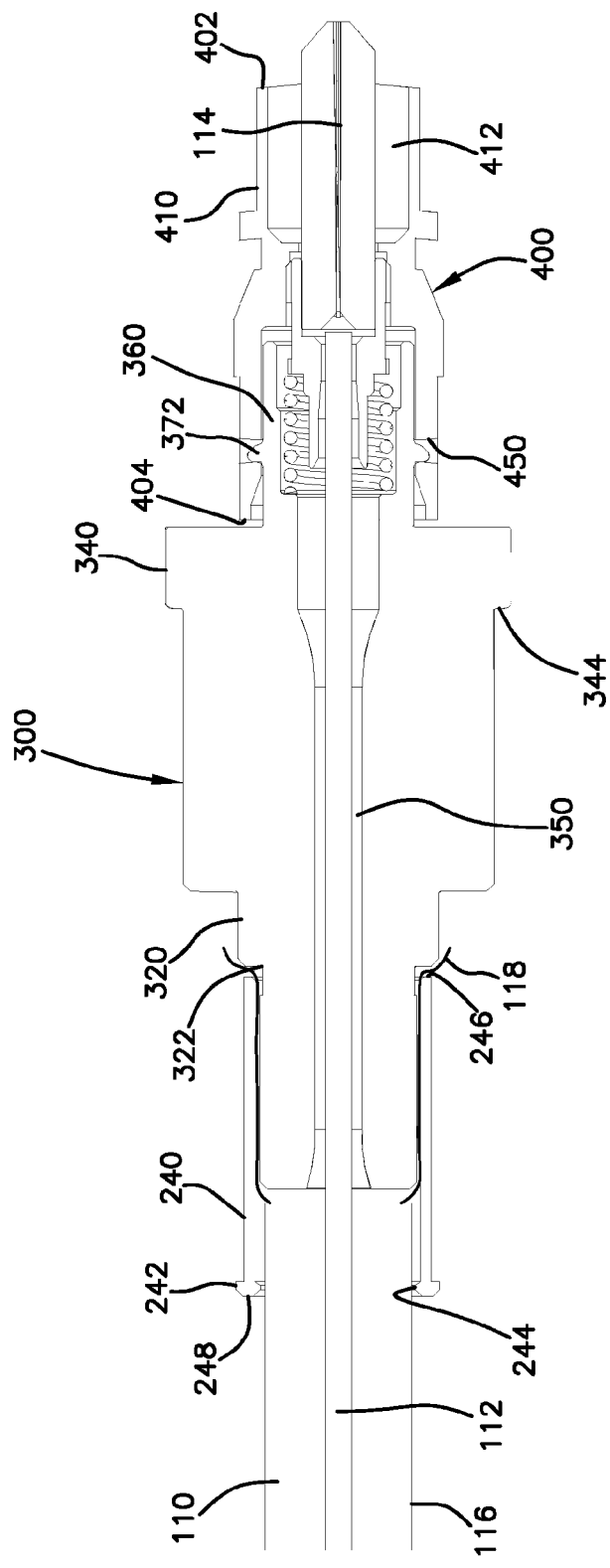
FIG. 15 is a cross-sectional elevation view showing the components and configuration of FIG. 12.

The unitary housing includes a central passage 350 that provides a conduit for passage of the optical fiber 114 and a buffer tube 112 of the fiber optic cable 110 (see FIGS. 14 and 15). The central passage 350 is preferably axisymmetric and can be contoured to provide clearance for the optical fiber 114 and the buffer tube 112 as the cable 110 is flexed and/or the ferrule 210 is pressed in against the ferrule spring 230.

The unitary housing 300 is preferably made of metal and can be machined from a single piece of metal stock or can be die cast. The unitary housing 300 can alternately be made of other material, such as plastic or glass.

Figure 7:
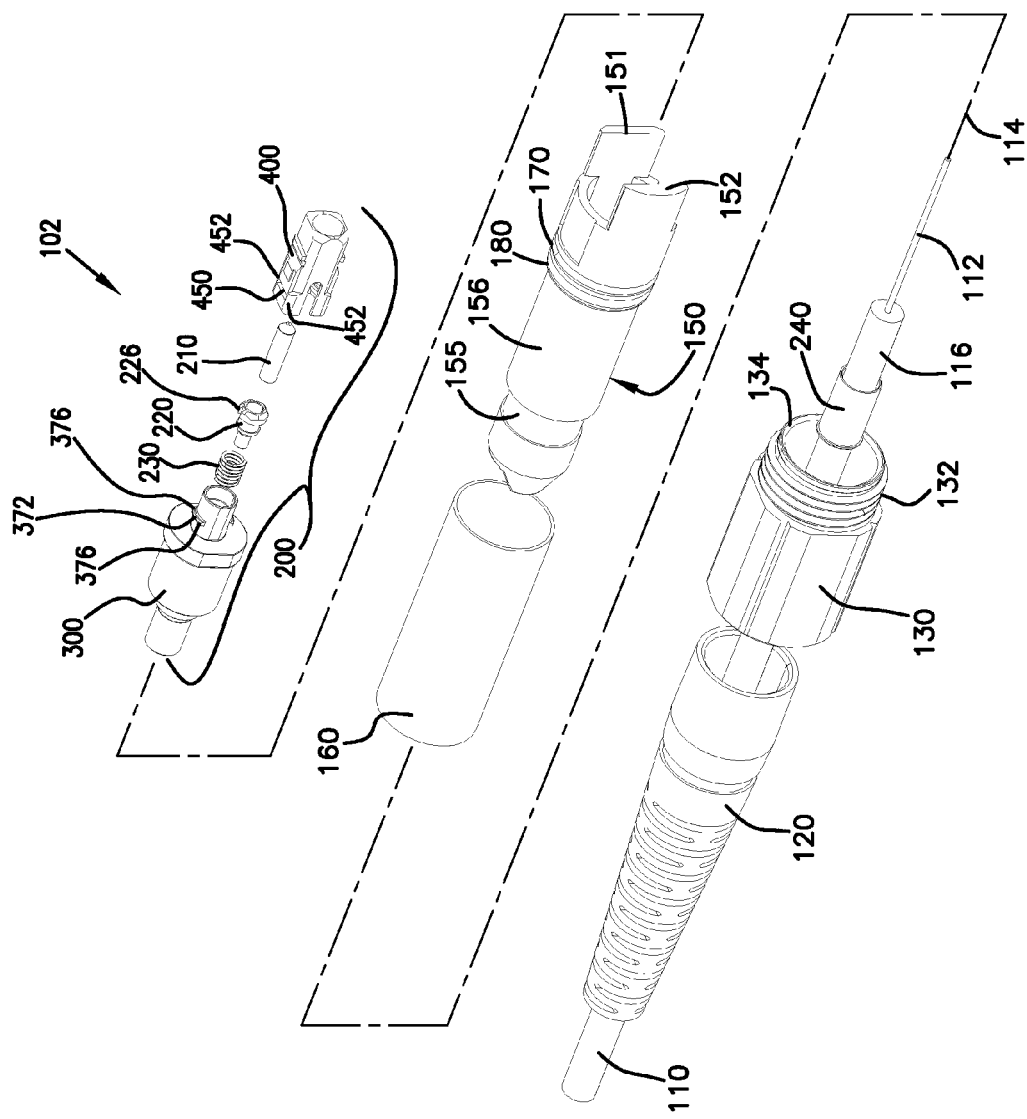
FIG. 7 is an exploded perspective view of the hardened fiber optic connector of FIG. 4.
Figure 8:
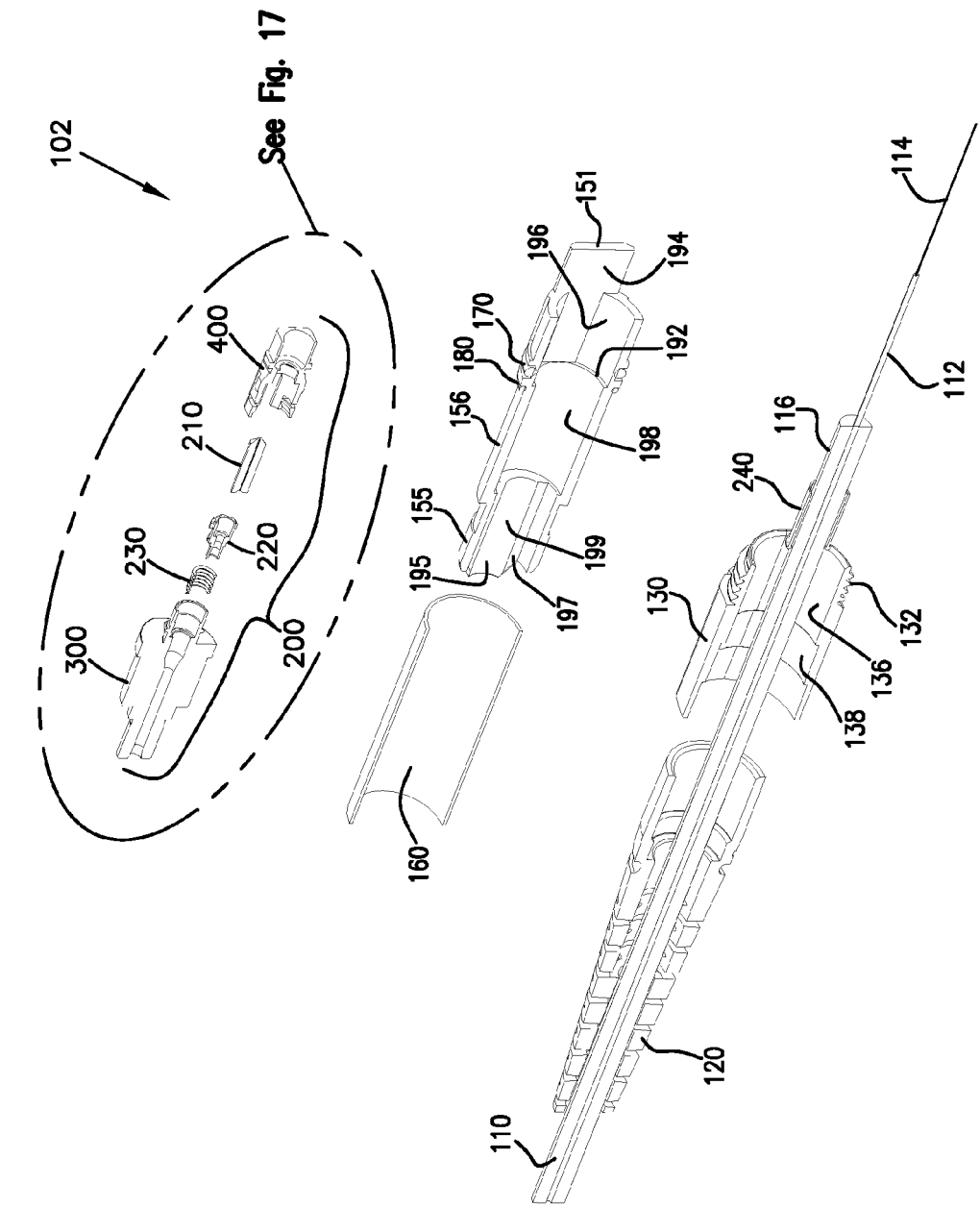
FIG. 8 is the exploded perspective view of FIG. 7 shown in cross-section.
Figure 9:
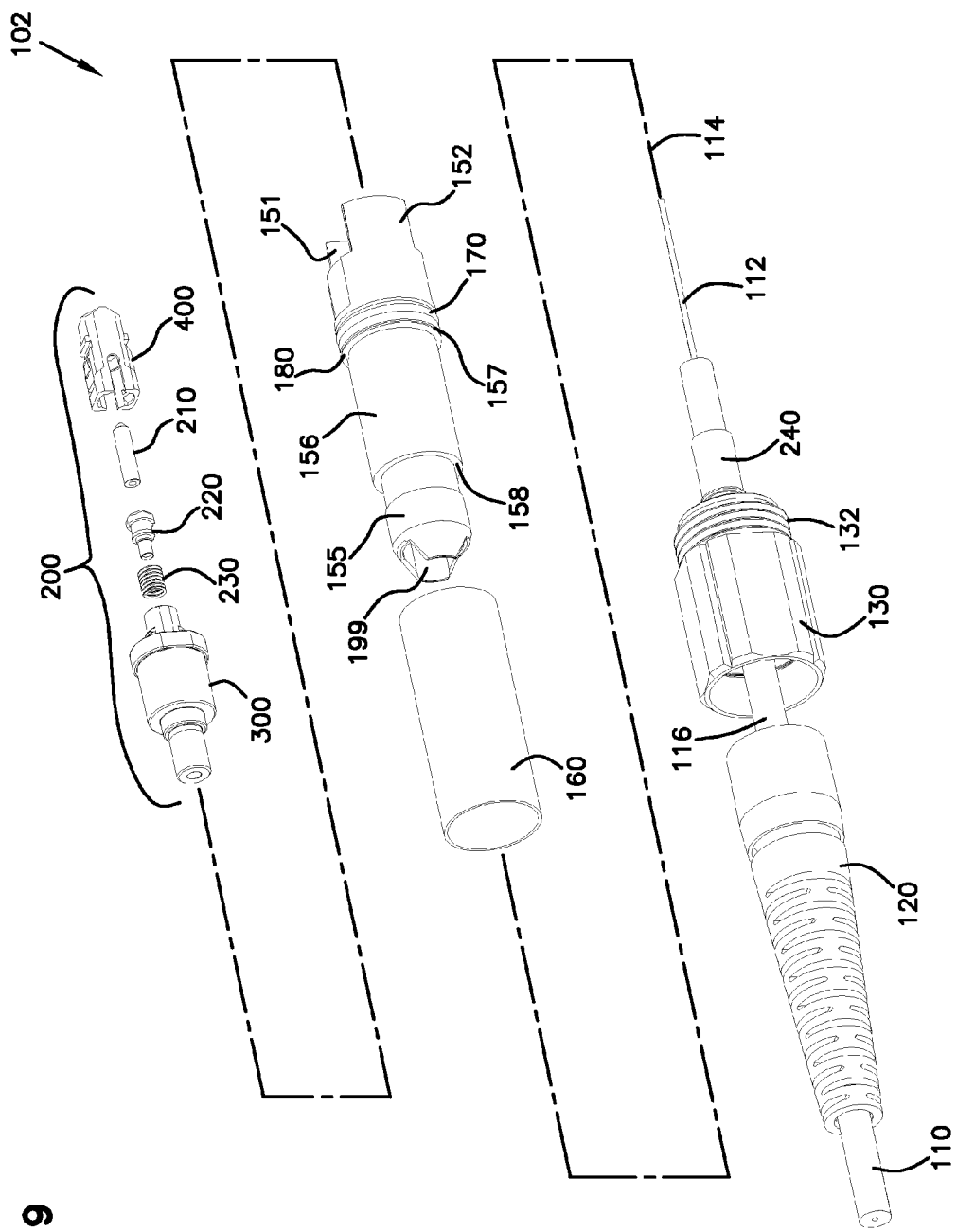
FIG. 9 is another exploded perspective view of the hardened fiber optic connector of FIG. 4.
Figure 10:
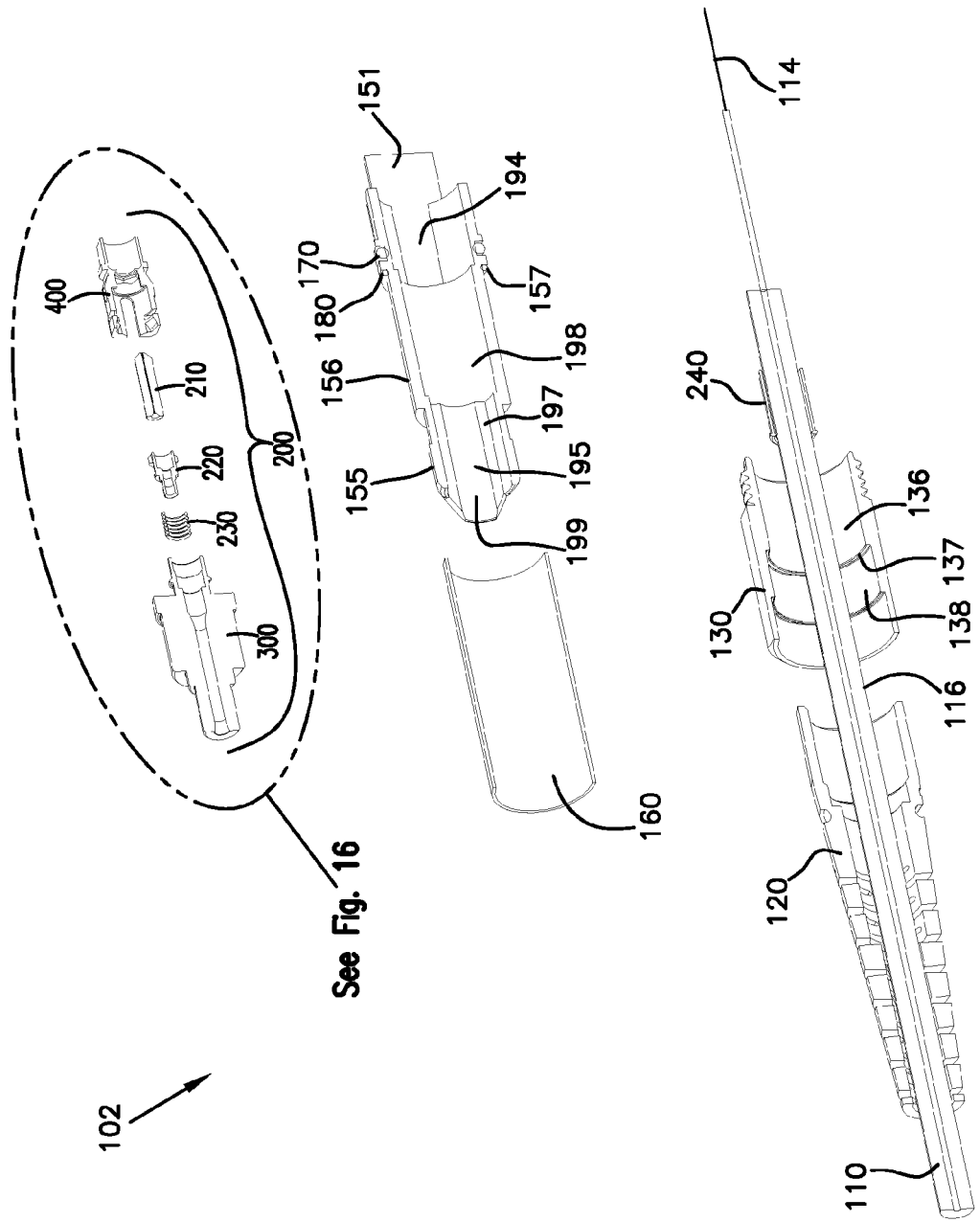
FIG. 10 is the exploded perspective view of FIG. 9 shown in cross-section.

To assemble and connect the fiber optic connector 102 to the fiber optic cable 110, a strain relief boot 120, the coupling nut 130, a shrink tube 160, and the connecting/sealing sleeve 150 are first prepositioned on the fiber optic cable 110 preferably in this order. The orientation of the strain relief boot 120, the coupling nut 130, and the connecting/sealing sleeve 150 with respect to the cable 110 is shown at FIG. 7. The connector body assembly 200 is then assembled and connected to the cable 110 as described below. The connecting/sealing sleeve 150, the shrink tube 160, the coupling nut 130, and the strain relieve boot 120 are then assembled as described below.

A detailed description of a connection between the unitary housing 300 and the connector body 400 will now be given including a preferred method of assembling the connector body assembly 200.

In an example embodiment, illustrated at FIGS. 14-17, a first end 302 of the unitary housing 300 includes an integrated coupling 360 for joining the connector body 400 and the unitary housing 300. The first end 302 of the unitary housing 300 can further include a spring pocket 363 with a spring seat 368 and other features useful for the fiber optic connector 102.

In a preferred embodiment, the integrated coupling 360 of the unitary housing 300 includes a substantially cylindrical male mounting surface 362 for engaging a substantially cylindrical female mounting surface 470 of the connector body 400. A pair of coupling tabs 372 of the integrated coupling 360 can be provided on opposite sides (i.e., a top side and a bottom side) of the male mounting surface 362 for engaging a pair of similarly positioned attachment slots 450 of the connector body 400.

The connector body 400 preferably includes a pair of notches or slits 460 on opposite sides (i.e., a right side and a left side) of at least a portion of the female mounting surface 470; wherein the notches or slits 460 extend through the connector body 400. The notches or slits 460 effectively form a pair of retention arms 462, 464 on the connector body 400. One of the aforementioned attachment slots 450 are positioned on each of the retention arms 462, 464.

To assemble the connector body assembly 200, including the connector body 400, the fiber optic ferrule 210, the ferrule holder 220, the ferrule spring 230, and the unitary housing 300; the ferrule 210 and the ferrule holder 220 (which may be preassembled and bonded to each other) are loaded into the connector body 400. In certain embodiments, a pair of keyways 226 of the ferrule holder 220 must be aligned with a pair of anti-rotation keys 430 of the connector body 400. A first end 234 of the ferrule spring 230 can be loaded into the spring pocket 363 of the unitary housing 300 or a second end 232 of the ferrule spring 230 can be positioned around a spring piloting diameter 229 of the ferrule holder 220. The first end 404 of the connector body 400 is then positioned facing the integrated coupling 360 of the unitary housing 300 such that the pair of coupling tabs 372 is positioned to match the pair of attachment slots 450. The connector body 400 is then pressed onto the integrated coupling 360 with the female mounting surface 470 of the connector body 400 positioned over the male mounting surface 362 of the integrated coupling 360. As the first end 404 of the connector body 400 reaches the coupling tabs 372 of the integrated coupling 360, a pair of ramps 440 at ends of the retention arms 462, 464 of the connector body 400 engage sloped surfaces 374 included on the coupling tabs 372. Continued pressing of the connector body 400 onto the integrated coupling 360 spreads the retention arms 462, 464 of the connector body 400 apart allowing the attachment slots 450 of the connector body 400 to be snapped over the coupling tabs 372 of the integrated coupling 360. As shown at FIG. 7, ends 376 of the coupling tabs 372 can engage ends 452 of the attachment slots 450 to provide an anti-rotation connection between the unitary housing 300 and the connector body 400. Upon the attachment slots 450 snapping over the coupling tabs 372, the joining of the connector body 400 and the unitary housing 300 is complete, and the connector body assembly 200 is assembled.

A detailed description of the attachment between the unitary housing 300 and the cylindrical fiber optic cable 110 will now be given including a preferred method of assembling the same.

In an example embodiment, a second end 304 of the unitary housing 300 of the hardened fiber optic connector 102 includes a gripping surface 312 to grip the strength members 118 of the strength layer 111 of the cylindrical fiber optic cable 110. The gripping surface 312 is preferably a cylindrical surface 310 approximately matched in diametric size to the outer diameter of cylindrical fiber optic cable 110.

The fiber optic cable 110 is prepared for connection with the unitary housing 300 by installing the crimp sleeve 240 over an end of the cable 110 and prepositioning the crimp sleeve 240 onto the cable 110 a distance away from the end of the cable 110. A portion of the outer jacket 116 of the cable 110 adjacent the end of the cable 110 is stripped off the cable 110 thus exposing a sufficient length of the optical fiber 114 and the strength layer 111 and making a new end 113 of the outer jacket 116 on the cable 110. The strength layer 111 is further trimmed in length leaving a length of exposed strength members 118 approximately matching a length of the gripping surface 312 of the unitary housing 300.

Figure 11:
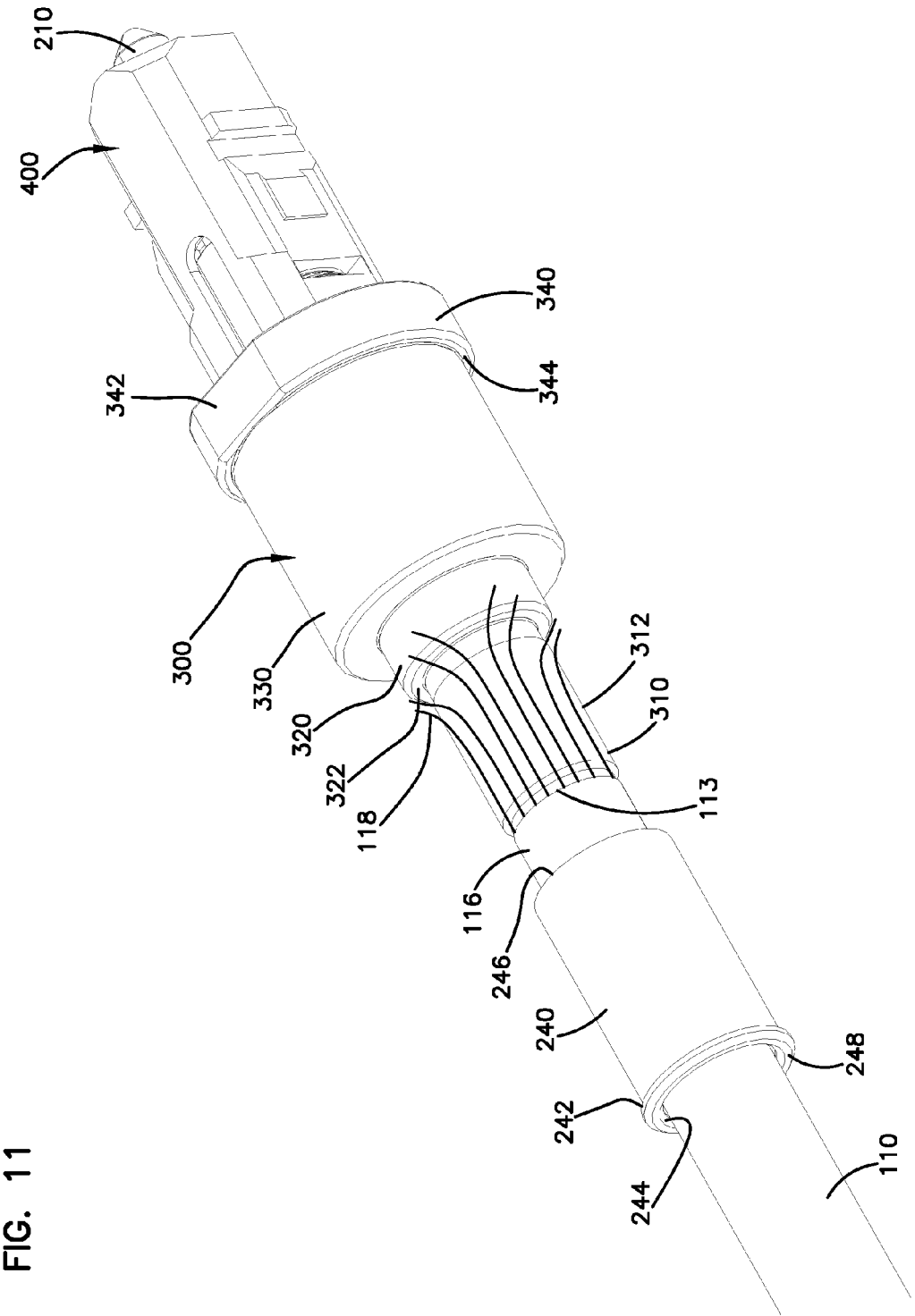
FIG. 11 is a perspective view of certain components of the hardened fiber optic connector of FIG. 1 including a connector body coupled to a unitary housing, strength members of the cylindrical fiber optic cable circumferentially positioned around a gripping surface of the unitary housing, and a crimp sleeve prepositioned around the cylindrical cable.

To securely connect the prepared fiber optic cable 110 and the unitary housing 300, the exposed optical fiber 114 and optionally the buffer tube 112 of the cable 110 are inserted (i.e., threaded) through the central passage 350 of the unitary housing 300. As the exposed strength members 118 near the gripping surface 312 of the unitary housing 300, the exposed strength members 118 are circumferentially positioned around the gripping surface 312 (see FIG. 11). The insertion of the exposed optical fiber 114 continues until the new end 113 of the outer jacket 116 is approximately adjacent the gripping surface 312 of the unitary housing 300 as illustrated at FIG. 11. The optical fiber 114 extends through the central passage 350 of the unitary housing 300, the spring 230, a passage 228 of the ferrule holder 220, and a passage 212 through the ferrule 210. The optical fiber 114 can be bonded to the ferrule 210, trimmed, and polished. The prepositioned crimp sleeve 240 is then slid in a direction 510 (see FIG. 12) and a first end 246 of the crimp sleeve 240 is slid past the new end 113 of the outer jacket 116 and positioned over the exposed strength members 118 positioned around the gripping surface 312 of the unitary housing 300 as illustrated at FIGS. 12-15.

A crimping position of the crimp sleeve 240 is defined when the first end 246 of the crimp sleeve 240 abuts the crimp sleeve stopping shoulder 322 (see FIG. 15). The strength members 118 can extend between the first end 246 of the crimp sleeve 240 and the crimp sleeve stopping shoulder 322 as shown at FIG. 15 or the strength member 118 can be trimmed short of this and end within the crimp sleeve 240. The crimp sleeve 240 substantially covers the gripping surface 312, and a second end 248 of the crimp sleeve 240 preferably extends over a portion of the outer jacket 116 of the cable 110 when the crimp sleeve 240 is in a crimping position. The crimp sleeve 240 is then crimped finalizing the connection between the fiber optic cable 110 and the unitary housing 300. In a preferred embodiment, a hexagonal crimp in applied to the crimp sleeve 240. In other embodiments, other types of crimps can be used. In still other embodiments, a crimp is not used and a tight fit between the crimp sleeve 240, the gripping surface 312, and the strength members 118 holds the strength members 118 to the unitary housing 300.

Friction between the gripping surface 312, the strength members 118, and the crimp sleeve 240 and radial bearing support between the crimp sleeve 240 and the portion of the outer jacket 116 within the crimp sleeve 240 provide a secure connection between the fiber optic cable 110 and the unitary housing 300. In a preferred embodiment, an external flange 242 and/or an internal flange 244 are provided at the second end 248 of the crimp sleeve 240. The internal flange 244 can indent the jacket 116 of the cable 110 thereby providing additional connection support. The external flange 242 can provide structural support for the crimp sleeve 240 and reinforce the internal flange 244. The secure connection is capable of transferring significant loads between the fiber optic cable 110 and the hardened fiber optic connector 102.

Figure 5:
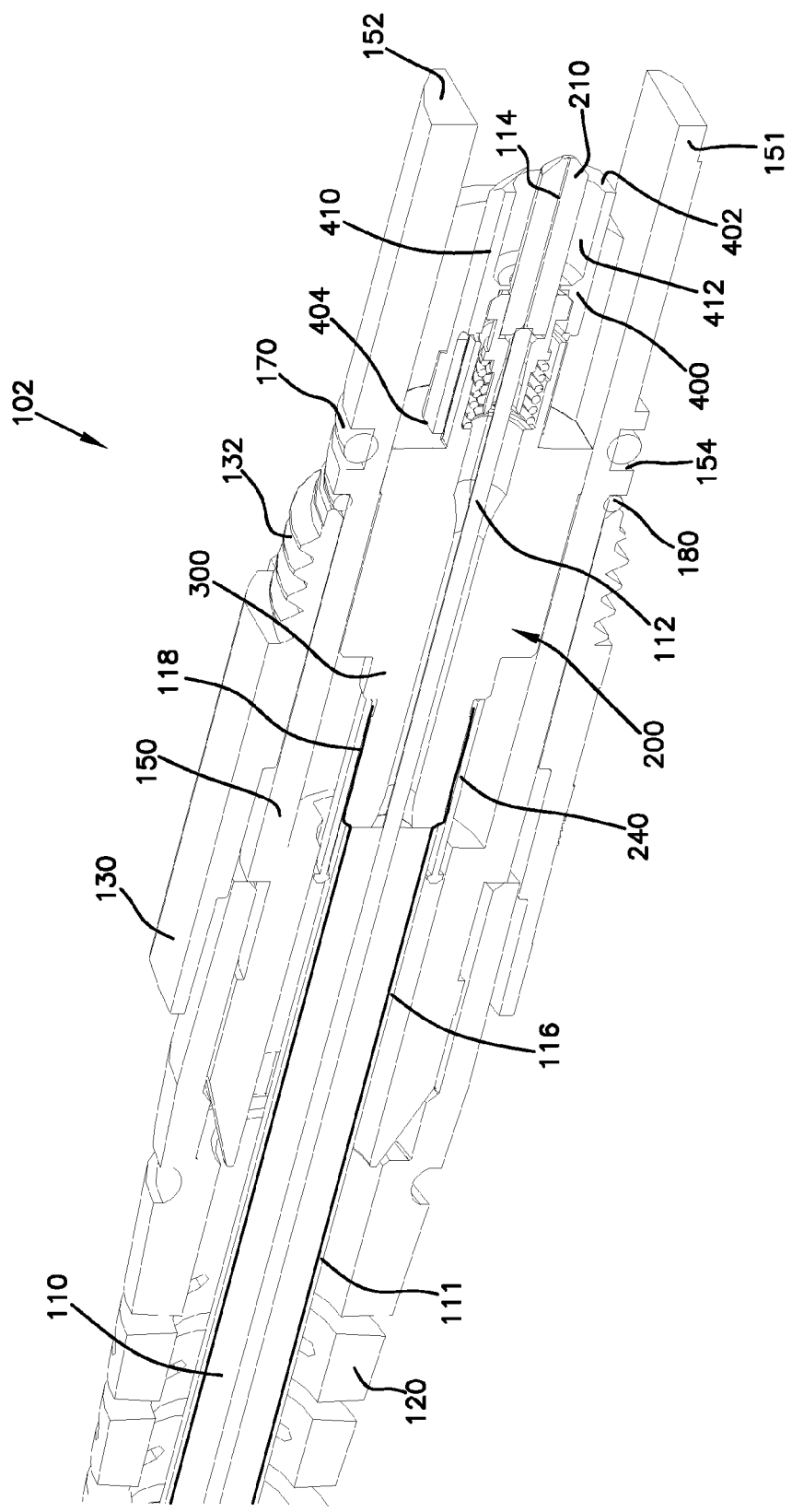
FIG. 5 is another perspective view of the hardened fiber optic connector of FIG. 4 shown in cross-section.
Figure 6:
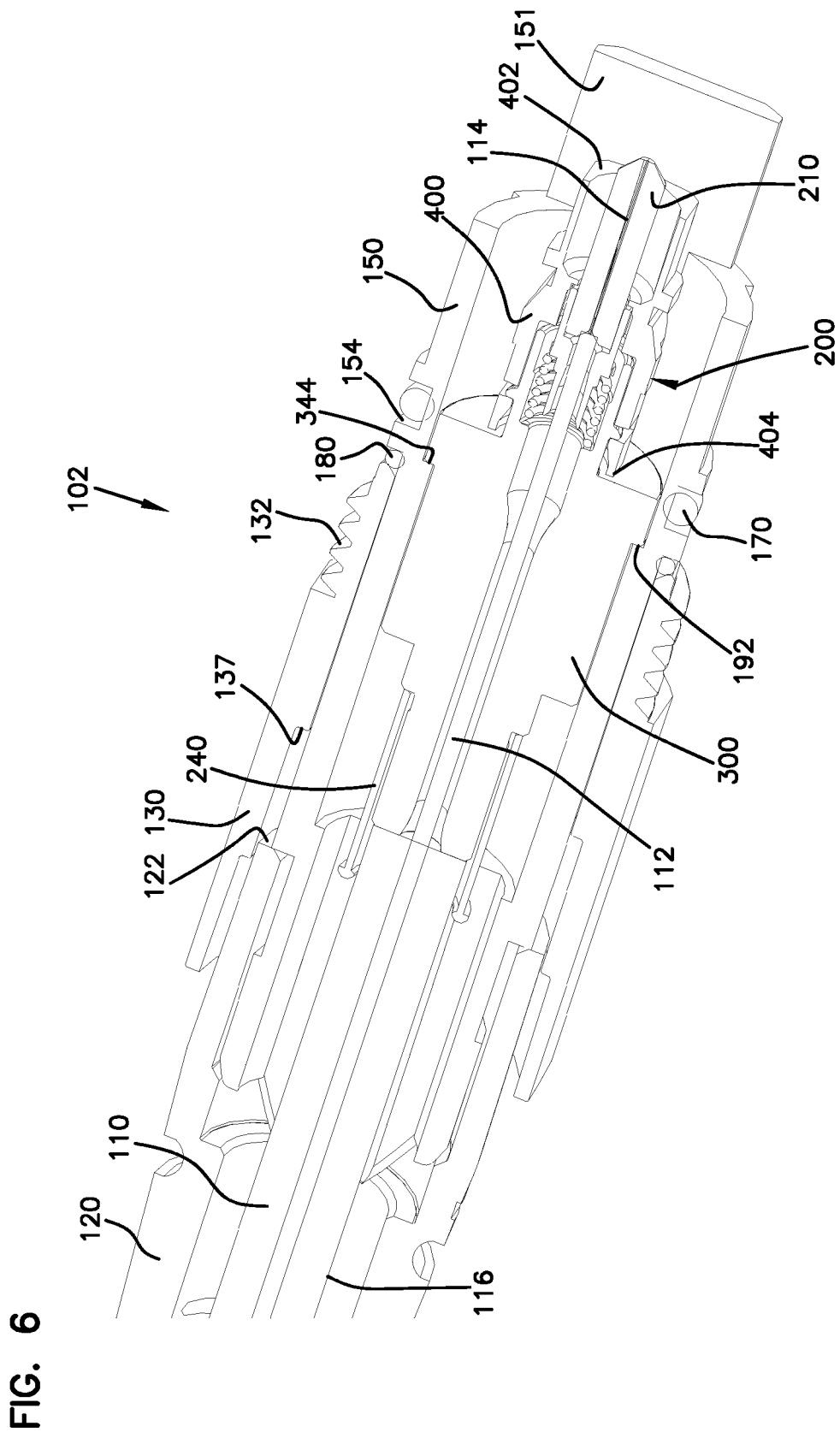
FIG. 6 is another perspective view of the hardened fiber optic connector of FIG. 4 shown with a cross-section perpendicular to the cross-section of FIG. 5.

Upon securement of the connector body assembly 200 to the fiber optic cable 110, the prepositioned connecting/sealing sleeve 150 is positioned over the connector body assembly 200 with the external piloting diameter 330 of the unitary housing 300 positioned within the piloting bore 198 of the connecting/sealing sleeve 150. In addition, the external anti-rotation flats 342 of the unitary housing 300 are aligned with the internal anti-rotation flats 194 of the connecting/sealing sleeve 150. The connecting/sealing sleeve 150 is slid over the connector body assembly 200 and located such that the pair of internal shoulders 192 of the connecting/sealing sleeve 150 is adjacent the pair of external shoulders 344 of the unitary housing 300 (see FIG. 6). The connecting/sealing sleeve 150 includes a passage 199 with a cylindrical portion 195 and an oblong portion 197 both extending along a length of the passage 199. The cylindrical portion 195 engages the jacket 116 of the cylindrical cable 110, and the oblong portion 197 is adapted to engage a jacket of a flat cable (see FIG. 10). The connecting/sealing sleeve 150 is therefore compatible with both cylindrical cables and oblong cables. (Only one cable is used in a given connector at one time.) The shrink tube 160 is then positioned over a shrink tube seat 155 (see FIG. 9) adjacent a boot stopping shoulder 158 of the connecting/sealing sleeve 150 and heat-shrunk thus sealing exteriors of the cable 110 and connecting/sealing sleeve 150 (see FIG. 3). In addition, the applied shrink tube 160 prevents the connector body assembly 200 from being removed from the connecting/sealing sleeve 150. FIGS. 2, 5, and 6 show the fiber optic connector 102 without the shrink tube 160.

With the shrink tube 160 shrunk around a portion of the cable 110 and the connecting/sealing sleeve 150, the inner diameter 136 of the prepositioned coupling nut 130 is positioned over the nut piloting diameter 156 of the connecting/sealing sleeve 150. The coupling nut 130 is thus rotatably mounted around the connecting/sealing sleeve 150.

Finally, the prepositioned strain relief boot 120 is positioned over a portion of the connecting/sealing sleeve 150 adjacent the boot stopping shoulder 158, as illustrated at FIG. 3. The strain relief boot 120 preferably stretches over a portion of the shrink tube 160 positioned over the shrink tube seat 155 of the connecting/sealing sleeve 150. The strain relief boot 120 can rely on friction to maintain this position or can be bonded (e.g., glued) in place. As illustrated at FIG. 3, an external shoulder 122 of the strain relief boot 120 prevents an internal shoulder 137 of the coupling nut 130 from sliding over the boot 120 thus capturing and preventing removal of the coupling nut 130 from the fiber optic connector 102. An enlarged interior diameter 138 of the coupling nut 130 (see FIGS. 3 and 10) is positioned over the external shoulder 122 of the strain relief boot 120 and thereby hides an end of the boot 120 adjacent the connecting/sealing sleeve 150 from direct exposure to contamination.

One example of an SC connector is illustrated and described at U.S. Pat. No. 5,317,663, that is hereby incorporated by reference in its entirety.

From the forgoing detailed description, it will be evident that modifications and variations can be made in the devices of the disclosure without departing from the spirit or scope of the invention.

What is claimed is:

1. A fiber optic connector for use with a fiber optic adapter, the fiber optic connector comprising:
    a one-piece unitary housing extending from a first end to a second end, the one-piece unitary housing including:
        a central passage extending from the first end to the second end of the one-piece unitary housing, the central passage defining a longitudinal axis and including a spring pocket at the first end of the one-piece unitary housing;
        a coupling protrusion extending from a first end at the first end of the one-piece unitary housing to a second end, the coupling protrusion including at least one coupling tab;
        a flange including a face adjacent the second end of the coupling protrusion and at least one external shoulder opposite the face, the at least one external shoulder facing the second end of the one-piece unitary housing; and
        a gripping surface positioned adjacent the second end of the one-piece unitary housing;
    a connector body extending from a first end to a second end, the connector body including:
        a portion that fits over the coupling protrusion adjacent the second end of the connector body,
        a plug portion at the first end of the connector body adapted for connection with the fiber optic adapter; and
        at least one retention arm extending from an end at the second end of the connector body towards the plug portion, the at least one retention arm including an attachment slot that receives the at least one coupling tab of the coupling protrusion of the one-piece unitary housing;
    a compression sleeve positioned over the gripping surface of the one-piece unitary housing, the compression sleeve and the gripping surface adapted to attach strength members of a fiber optic cable to the one-piece unitary housing between the compression sleeve and the gripping surface;
    a ferrule assembly mounted at least partially within the connector body, the ferrule assembly including a ferrule and a spring, the spring being positioned within the spring pocket of the central passage of the one-piece unitary housing and being configured to bias the ferrule towards the first end of the connector body;
    a sleeve including an internal shoulder that abuts the external shoulder of the flange of the one-piece unitary housing;
    a sealing member positioned at least partially within an exterior groove of the sleeve; and
    a retaining nut positioned around a portion of the sleeve and adapted to abut a nut shoulder of the sleeve.

2. The fiber optic connector of claim 1, wherein the one-piece unitary housing includes an external piloting surface that extends from the at least one external shoulder of the flange towards the second end of the one-piece unitary housing and wherein the sleeve includes an internal piloting surface that is positioned over the external piloting surface of the one-piece unitary housing.

3. The fiber optic connector of claim 1, further comprising a shrink tube adapted to be heat-shrunk and sealed about a shrink tube seat of the sleeve and a portion of the fiber optic cable.

4. The fiber optic connector of claim 1, wherein the sleeve, the sealing member, and the retaining nut are adapted to be at least partially received within a port of the fiber optic adapter and the fiber optic adapter is a hardened fiber optic adapter.

5. The fiber optic connector of claim 1, wherein the at least one coupling tab of the coupling protrusion includes a sloped surface and the at least one retention arm includes a ramp at the end of the at least one retention arm, wherein the at least one retention arm is a resilient retention arm and is spread apart from the longitudinal axis when the ramp engages the sloped surface, and wherein the attachment slot snaps over the coupling tab when the connector body is pressed onto the one-piece unitary housing.

6. The fiber optic connector of claim 1, wherein the at least one coupling tab of the coupling protrusion includes a first end and a second end and the attachment slot of the at least one retention arm includes a first end and a second end and wherein the first and the second ends of the attachment slot engage the first and the second ends of the coupling tab to provide an anti-rotation connection between the one-piece unitary housing and the connector body.

7. The fiber optic connector of claim 1, wherein the at least one coupling tab of the coupling protrusion is a pair of coupling tabs positioned on opposite sides of the longitudinal axis and the at least one retention arm of the connector body is a pair of retention arms and wherein the attachment slot on each of the retention arms receives one of the coupling tabs.

8. The fiber optic connector of claim 1, wherein the compression sleeve is a crimp sleeve.

9. The fiber optic connector of claim 2, wherein an interior of the sleeve includes at least one internal anti-rotation flat and the flange of the one-piece unitary housing includes at least one external anti-rotation flat and wherein the at least one internal anti-rotation flat engages the at least one external anti-rotation flat to rotationally position the sleeve relative to the one-piece unitary housing.

10. The fiber optic connector of claim 3, wherein the sleeve includes at least one orientation control blade at a first end of the sleeve adapted for connection with the fiber optic adapter, wherein the exterior groove is positioned between the at least one orientation control blade of the sleeve and a second end of the sleeve opposite the first end of the sleeve, wherein the nut shoulder of the sleeve is positioned between the exterior groove and the second end of the sleeve, and wherein the shrink tube seat of the sleeve is positioned between the nut shoulder and the second end of the sleeve.

11. A fiber optic cable assembly for use with a fiber optic adapter, the fiber optic cable assembly comprising:
   a fiber optic cable including an optical fiber and at least one strength member, the optical fiber having a terminated end;
   a one-piece unitary housing extending from a first end to a second end, the one-piece unitary housing including:
      a central passage extending from the first end to the second end of the one-piece unitary housing, the central passage defining a longitudinal axis and including a spring pocket at the first end of the one-piece unitary housing;
      a coupling protrusion extending from a first end at the first end of the one-piece unitary housing to a second end, the coupling protrusion including at least one coupling tab;
      a flange including a face adjacent the second end of the coupling protrusion and at least one external shoulder opposite the face, the at least one external shoulder facing the second end of the one-piece unitary housing;
      a gripping surface positioned adjacent the second end of the one-piece unitary housing; and
      an external piloting surface extending from the at least one external shoulder of the flange towards the second end of the one-piece unitary housing;
   a connector body extending from a first end to a second end, the connector body including:
      a portion that fits over the coupling protrusion adjacent the second end of the connector body;
      a plug portion at the first end of the connector body adapted for connection with the fiber optic adapter; and
      at least one retention arm extending from an end at the second end of the connector body towards the plug portion, the at least one retention arm including an attachment slot that receives the at least one coupling tab of the coupling protrusion of the one-piece unitary housing;
   a compression sleeve positioned over the gripping surface of the one-piece unitary housing, the compression sleeve and the gripping surface adapted to attach the at least one strength member of the fiber optic cable to the one-piece unitary housing between the compression sleeve and the gripping surface;
   a ferrule assembly mounted at least partially within the connector body, the ferrule assembly including a ferrule and a spring, the spring being positioned within the spring pocket of the central passage of the one-piece unitary housing and being configured to bias the ferrule towards the first end of the connector body;
   a sleeve including an internal shoulder that abuts the external shoulder of the flange of the housing, the sleeve including an internal piloting surface that is positioned over the external piloting surface of the one-piece unitary housing;
   a retaining member positioned around a portion of the sleeve and adapted to abut a shoulder of the sleeve; and
   a sealing member positioned at least partially within an exterior groove of the sleeve;
   wherein the optical fiber passes through the central passage of the one-piece unitary housing and a passage of the ferrule; and
   wherein the terminated end of the optical fiber is adjacent an end of the ferrule.

12. The fiber optic cable assembly of claim 11, further comprising a shrink tube adapted to be heat-shrunk and sealed about a shrink tube seat of the sleeve and a portion of the fiber optic cable.

13. The fiber optic cable assembly of claim 11, wherein the sleeve, the sealing member, and the retaining member are adapted to be at least partially received within a port of the fiber optic adapter and the fiber optic adapter is a hardened fiber optic adapter.

14. The fiber optic cable assembly of claim 11, wherein the at least one coupling tab of the coupling protrusion includes a sloped surface and the at least one retention arm includes a ramp at the end of the at least one retention arm, wherein the at least one retention arm is a resilient retention arm and is spread apart from the longitudinal axis when the ramp engages the sloped surface, and wherein the attachment slot snaps over the coupling tab when the connector body is pressed onto the one-piece unitary housing.

15. The fiber optic cable assembly of claim 11, wherein the at least one coupling tab of the coupling protrusion includes a first end and a second end and the attachment slot of the at least one retention arm includes a first end and a second end and wherein the first and the second ends of the attachment slot engage the first and the second ends of the coupling tab to provide an anti-rotation connection between the one-piece unitary housing and the connector body.

16. The fiber optic cable assembly of claim 11, wherein the at least one coupling tab of the coupling protrusion is a pair of coupling tabs positioned on opposite sides of the longitudinal axis and the at least one retention arm of the connector body is a pair of retention arms and wherein the attachment slot on each of the retention arms receives one of the coupling tabs.

17. The fiber optic cable assembly of claim 11, wherein the compression sleeve is a crimp sleeve.

18. The fiber optic cable assembly of claim 11, wherein an interior of the sleeve includes at least one internal anti-rotation flat and the flange of the one-piece unitary housing includes at least one external anti-rotation flat and wherein the at least one internal anti-rotation flat engages the at least one external anti-rotation flat to rotationally position the sleeve relative to the one-piece unitary housing.

19. A fiber optic cable assembly, for use with a fiber optic adapter, the fiber optic cable assembly comprising:
   a fiber optic cable including an optical fiber and at least one strength member, the optical fiber having a terminated end;
   a one-piece unitary housing extending from a first end to a second end, the one-piece unitary housing including:
      a central passage extending from the first end to the second end of the one-piece unitary housing, the central passage defining a longitudinal axis and including a spring pocket at the first end of the one-piece unitary housing;
      a coupling protrusion extending from a first end at the first end of the one-piece unitary housing to a second end, the coupling protrusion including at least one coupling tab;
      a flange including a face adjacent the second end of the coupling protrusion and at least one external shoulder opposite the face, the at least one external shoulder facing the second end of the one-piece unitary housing; and
      a gripping surface positioned adjacent the second end of the one-piece unitary housing;
   a connector body extending from a first end to a second end, the connector body including:
      a portion that fits over the coupling protrusion adjacent the second end of the connector body,
      a plug portion at the first end of the connector body adapted for connection with the fiber optic adapter; and
      at least one retention arm extending from an end at the second end of the connector body towards the plug portion, the at least one retention arm including an attachment slot that receives the at least one coupling tab of the coupling protrusion of the one-piece unitary housing;
   a compression sleeve positioned over the gripping surface of the one-piece unitary housing, the compression sleeve and the gripping surface adapted to attach the at least one strength member of the fiber optic cable to the one-piece unitary housing between the compression sleeve and the gripping surface;
   a ferrule assembly mounted at least partially within the connector body, the ferrule assembly including a ferrule and a spring, the spring being positioned within the spring pocket of the central passage of the one-piece unitary housing and being configured to bias the ferrule towards the first end of the connector body;
   a sleeve including an internal shoulder that abuts the external shoulder of the flange of the housing;
   a retaining member positioned around a portion of the sleeve and adapted to abut a shoulder of the sleeve; and
   a shrink tube adapted to be heat-shrunk and sealed about a shrink tube seat of the sleeve and a portion of the fiber optic cable;
   wherein the optical fiber passes through the central passage of the one-piece unitary housing and a passage of the ferrule;
   wherein the terminated end of the optical fiber is adjacent an end of the ferrule; and
   wherein the sleeve includes at least one orientation control blade at a first end of the sleeve adapted for connection with the fiber optic adapter, wherein an exterior groove of the sleeve is positioned between the at least one orientation control blade of the sleeve and a second end of the sleeve opposite the first end of the sleeve, wherein the shoulder of the sleeve is positioned between the exterior groove and the second end of the sleeve, and wherein the shrink tube seat of the sleeve is positioned between the shoulder of the sleeve and the second end of the sleeve.

20. A fiber optic connector for use with a fiber optic adapter, the fiber optic connector comprising:
   a housing including:
      a main body having a first end and a second end and an outer surface;
      a central passage extending from the first end to the second end of the main body, the central passage defining a longitudinal axis and including a spring pocket adjacent the first end of the main body;
      a first coupling member adjacent the first end of the main body;
      a flange including at least one external shoulder facing the second end of the main body; and
      an attachment surface facing away from the longitudinal axis and positioned adjacent the second end of the main body, the attachment surface positioned closer to the longitudinal axis than the outer surface of the main body;
   a connector body extending from a first end to a second end, the connector body including:
      a second coupling member adjacent the second end of the connector body coupled to the first coupling member of the housing; and
      a plug portion at the first end of the connector body adapted for connection with the fiber optic adapter;
   a compression sleeve positioned over the attachment surface of the housing, the compression sleeve and the attachment surface adapted to attach at least one strength member of a fiber optic cable to the housing between the compression sleeve and the attachment surface;
   a ferrule assembly mounted at least partially within the connector body, the ferrule assembly including a ferrule and a spring, the spring being positioned within the spring pocket of the central passage of the housing and being configured to bias the ferrule away from the second end of the main body; and
   a connecting sleeve including an internal shoulder that abuts the external shoulder of the flange of the housing, the connecting sleeve adapted to structurally connect the fiber optic connector to a receiving structure adapted to receive the fiber optic connector, the connecting sleeve including an exterior groove adapted for receiving a sealing member.

21. The fiber optic connector of claim 20, wherein the receiving structure is the fiber optic adapter.

22. The fiber optic connector of claim 20, wherein the receiving structure is a cap adapted for transmitting a pulling force to the fiber optic connector.

23. The fiber optic connector of claim 20, further comprising a retaining member positioned around at least a portion of the connecting sleeve and adapted to abut a shoulder of the connecting sleeve.

24. The fiber optic connector of claim 23, wherein the retaining member is a nut.

25. The fiber optic connector of claim 20, wherein the housing is monolithic.

26. The fiber optic connector of claim 20, wherein the outer surface of the main body of the housing and the attachment surface of the housing are cylindrical.

27. The fiber optic connector of claim 26, wherein the connecting sleeve includes an internal cylindrical surface that directly contacts the cylindrical outer surface of the main body.

28. The fiber optic connector of claim 27, wherein the compression sleeve is spaced from the internal cylindrical surface of the connecting sleeve.

* * * * *